(12) United States Patent
Stewart et al.

(10) Patent No.: US 11,918,960 B2
(45) Date of Patent: Mar. 5, 2024

(54) SYSTEM AND METHOD FOR DOSING WINE BARRELS WITH SULFUR DIOXIDE GAS

(71) Applicant: AIRGAS, INC., Radnor, PA (US)

(72) Inventors: James Stewart, Perrysburg, OH (US); Mark Doore, Perrysburg, OH (US); Christopher G. Williams, Brunswick, OH (US)

(73) Assignee: AIR GAS, INC., Radnor, PA (US)

(*) Notice: Subject to any disclaimer, the term of this patent is extended or adjusted under 35 U.S.C. 154(b) by 283 days.

(21) Appl. No.: 17/321,385

(22) Filed: May 14, 2021

(65) Prior Publication Data

US 2022/0362722 A1    Nov. 17, 2022

(51) Int. Cl.
C12H 1/14      (2006.01)
B01F 23/236    (2022.01)

(52) U.S. Cl.
CPC ........... B01F 23/2362 (2022.01); C12H 1/14 (2013.01)

(58) Field of Classification Search
CPC .............................. B01F 23/2362; C12H 1/14
See application file for complete search history.

(56) References Cited

U.S. PATENT DOCUMENTS

| 4,826,029 | A | 5/1989 | Skoglie |
| 6,183,982 | B1 | 2/2001 | Nastasia |
| 2015/0353875 | A1 | 12/2015 | Bonneau et al. |

FOREIGN PATENT DOCUMENTS

WO    WO 2017/091088 A1 *  6/2017

OTHER PUBLICATIONS

Jim Lockard on Wine, "The Best Wine Opener I've Found," HTTPS://jimlockardonwine.com/2015/02/01/the-best-wine-opener-ive-found/, Feb. 1, 2015, printed from Internet May 9, 2018.
Adams, Andrew, "Barrel-Washing Protocols—Winemakers opt for a mix of steam, ozone and high-pressure hot water to keep barrels in top shape," Wines & Vines, https://www.winesandvines.com/features/article/109491/Barrel-Washing-Protocols, Jan. 2013 Issue of Wines & Vines, printed from Internet May 9, 2018, 11 pgs.
Oregon OSHA Fact Sheet, "Using sulfur dioxide to sanitize wine barrels and corks," osha.oregon.gov, OR-OSHA (May 2017) FS-73, 2 pgs.

* cited by examiner

*Primary Examiner* — Sean E Conley
(74) *Attorney, Agent, or Firm* — Yan Jiang

(57) ABSTRACT

A system and method for dosing $SO_2$ into wine barrels is achieved with a device including a compressed gas cylinder containing compressed liquefied $SO_2$ under its own vapor pressure, a dosing wand fluidly connected to the cylinder via a hose that is adapted and configured to allow a flow of gaseous $SO_2$ from the source to the dosing wand. The dosing wand includes a hollow needle dispensing nozzle and a $SO_2$ batch flow controller in fluid communication between the hose and the hollow needle. The hollow needle dispensing nozzle is adapted and configured to pierce through a bung opening of a wine barrel and has at least one aperture at a terminal end thereof to allow gaseous $SO_2$ to be dispensed into an interior of the wine barrel.

6 Claims, 2 Drawing Sheets

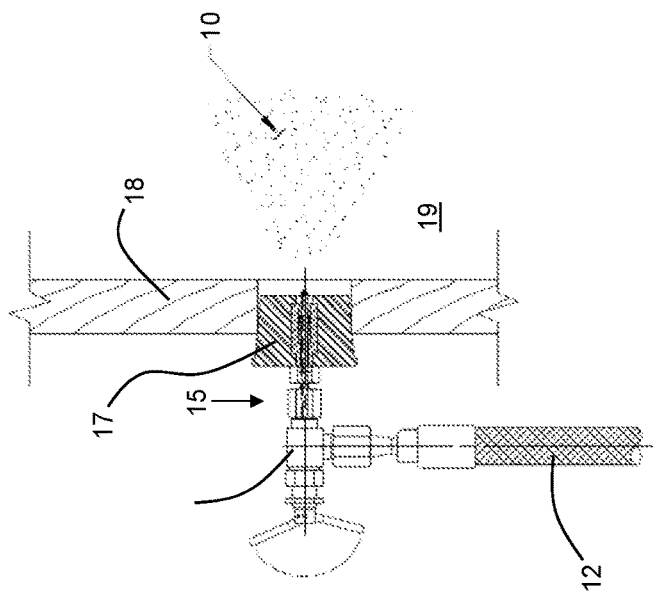
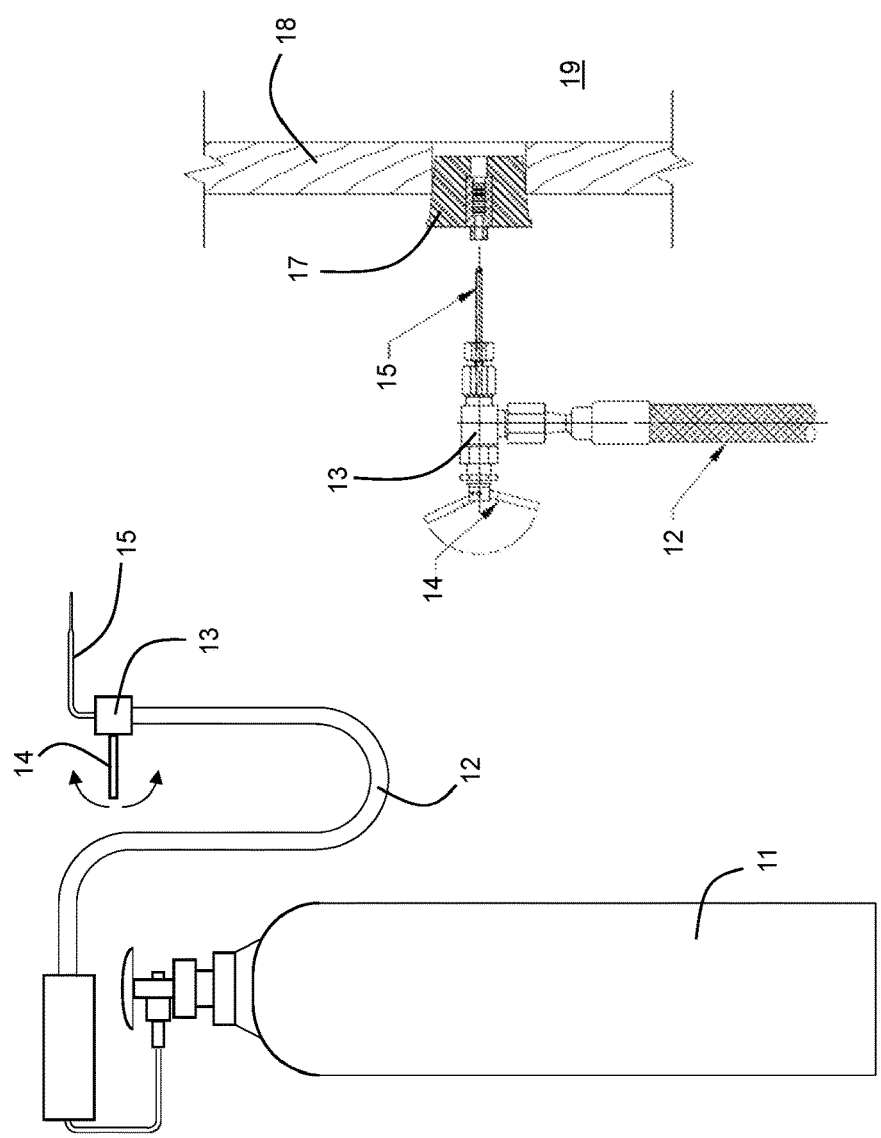

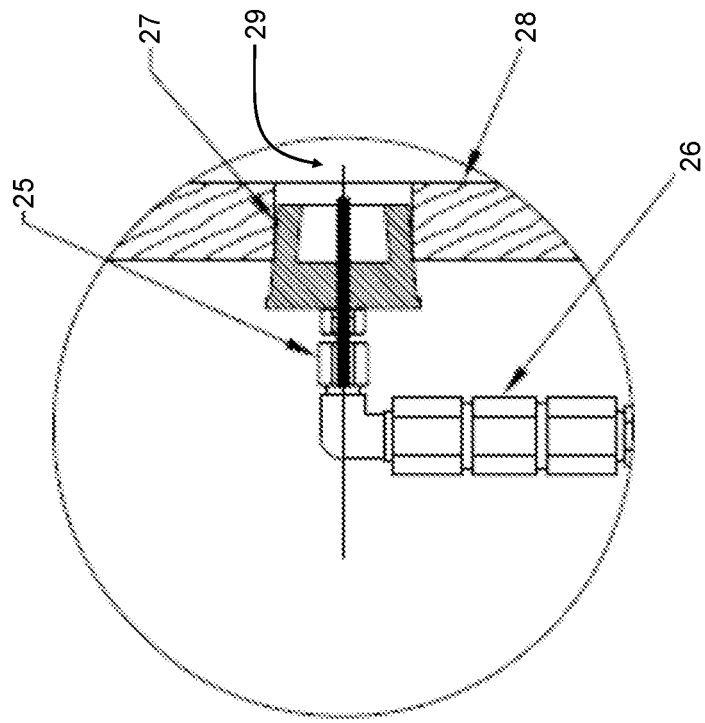
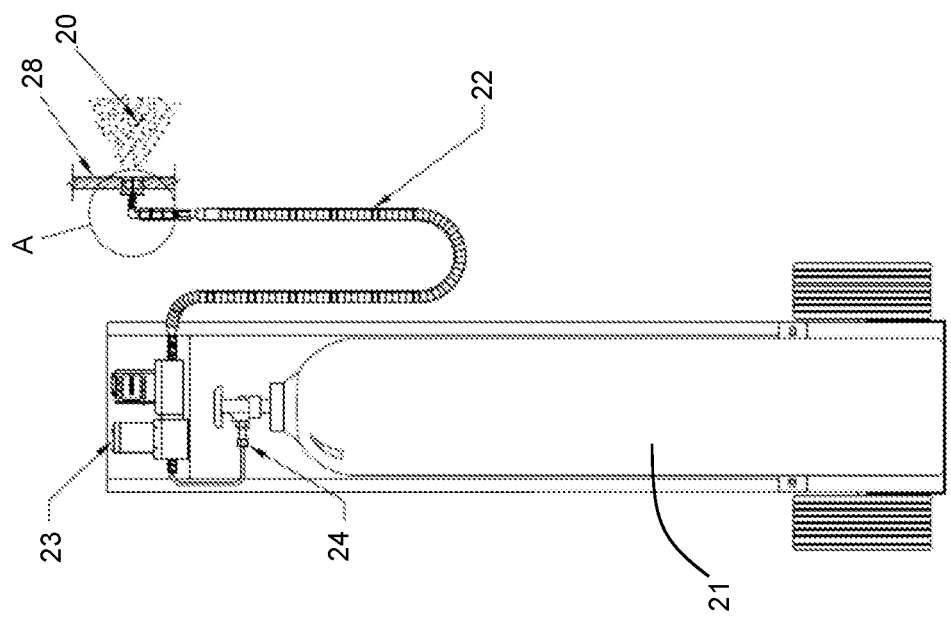
FIG 2B
FIG 2A

SYSTEM AND METHOD FOR DOSING WINE BARRELS WITH SULFUR DIOXIDE GAS

CROSS-REFERENCE TO RELATED APPLICATIONS

None.

BACKGROUND

Field of the Invention

The invention relates to a dosing wine barrels with Sulfur Dioxide gas.

Related Art

Sulfur Dioxide ($SO_2$) is a compressed liquefied gas that is 2.264 times heavier than air. It is typically stored in steel, U.S. Department of Transportation (DOT) approved cylinders under its own vapor pressure at ambient temperature. At a room temperature of 70° F., $SO_2$ will have a vapor pressure of 34 psig.

While present in the atmosphere from natural sources such as volcanic eruptions, $SO_2$ is a major pollutant and precursor to acid rain. It also has a detrimental impact on plant and animal life. Indeed, $SO_2$ is classified as having acute inhalation toxicity, skin corrosion, and eye irritation. For these and other reasons, industrial sources of $SO_2$ pollution have been targeted worldwide for reductions in emissions.

$SO_2$ is a toxic gas with an Occupational Safety and Health Administration (OSHA) permissible exposure limit (PEL) of 2 ppm on a time weighted average for 8 hours, and a short term exposure limit (STEL) of 5 ppm (on a time weighted average) for 15 minutes. The National Institute for Occupational Safety and Health (NIOSH) has set the immediately dangerous to life or health (IDLH) level at 100 ppm. Inhaling $SO_2$ will result in respiratory symptoms including difficulty breathing and premature death. Skin contact can result in chemical burns. Eye contact can result in chemical burns and blindness.

$SO_2$ is used extensively in the wine industry as a fumigant and antimicrobial. It is favored over other alternatives because it is readily available, effective, and does not taint the wine or materials that come in contact with the wine. It is used in treatment of empty wine barrels to kill unwanted microbes that can cause the wine to spoil.

In the U.S., the use of $SO_2$ for fumigation purposes is licensed and controlled at the state level. Accordingly, the various rules used to control emission of and exposure to $SO_2$ vary from state to state.

$SO_2$ has been used in winemaking since ancient times. The earliest means of treating empty wine vessels was by placing a Sulfur candle inside the barrel. To some extent this method may persist even today, as it has proven effective to some degree. However, the potentially toxic impact upon the operator and the environment make this method undesirable.

The state of the art technique is to use a hose connected to a $SO_2$ cylinder and a dosing wand that is not dissimilar to equipment conventionally used to fill an automobile tire with compressed air. Dosage is controlled by a two to three second count while holding the valve lever open. After removal of the bung from the wine barrel, a short tube is inserted through the bung opening to allow the $SO_2$ to be sprayed mostly into the inside of the barrel. Because the bung opening (e.g., 2") in relation to the outside diameter of the spray wand (e.g., ¼") is quite significant, use of such a technique allows significant spillage of $SO_2$ into the ambient atmosphere surrounding the operator. After dosing, a disposable paper cup is typically used to plug the bung opening. This method of plugging the bung opening has an unknown but non-zero leakage rate.

The wine barrel $SO_2$ dosage desired by winemakers is the subject of much industry secrecy. Little documentation has been published on the amount of $SO_2$ recommended for used in barrel fumigation. Guidelines for the use of $SO_2$ as a fumigant are very loose. Given human nature, overdosing of the empty wine barrel is highly likely. This also results in even higher levels of environmental exposure in the ambient atmosphere surrounding the operator and/or persons working around the dosed wine barrels.

SUMMARY OF THE INVENTION

An aim of the invention is to overcome all or some of the prior art disadvantages stated above.

Towards this end, there is disclosed.

BRIEF DESCRIPTION OF THE FIGURES

Other characteristic features and advantages will emerge upon reading the following description, with reference to the figures in which:

FIG. 1A is a schematic view of an embodiment of the system of the invention including a toggle valve.

FIG. 1B is a schematic and partial view of the system of FIG. 1A prior to insertion of the hollow needle dispensing nozzle through the wine barrel bung.

FIG. 1C is a schematic and partial view of the system of FIG. 1A after insertion of the hollow needle dispensing nozzle through the wine barrel bung.

FIG. 2A is a schematic view of another embodiment of the system of the invention including a mass flow controller.

FIG. 2B is a schematic and partial view of the system of FIG. 2A after insertion of the hollow needle dispensing nozzle through the wine barrel bung.

DETAILED DESCRIPTION OF THE INVENTION

The invention allows the efficient and safe dosing of empty wine barrels with $SO_2$. This is accomplished while minimizing the impact upon the number of barrels that an operator can dose per hour. Safety is enhanced by reducing the potential spillage to very low levels.

The system of the invention includes a compressed $SO_2$ cylinder containing liquefied $SO_2$ under its own vapor pressure, a dosing wand, a $SO_2$ compatible hose connecting the cylinder and dosing wand, and a $SO_2$ batch flow controller in fluid communication between the cylinder and the hollow needle dispensing nozzle. The dosing wand includes a hollow needle dispensing nozzle.

The cylinder is typically a DOT-approved steel compressed gas cylinder that is suitable for $SO_2$ use. It contains liquefied $SO_2$ under its own vapour. When stored at 70° F., the cylinder typically has a pressure of about 34 psig. Optionally, the cylinder may be provided with a pressure regulator and/or pressure sensor.

The hose is flexible and typically made of a $SO_2$-compatible elastomeric material surrounded by one or more layers of braided stainless steel. Depending upon where the $SO_2$ batch flow controller is disposed along the $SO_2$ flow path from the cylinder to the hollow needle dispensing nozzle, a first, upstream end of the hose is provided with a fitting that is adapted and configured to be connected to the cylinder or the $SO_2$ batch flow controller in fluid-tight fashion. Similarly, a second, downstream end of the hose is provided with a fitting that is adapted and configured to be connected to either the $SO_2$ batch flow controller or the dosing wand.

Given suitable fittings, the dosing wand may be comprised of just the hollow need dispensing nozzle itself. Alternatively, the dosing wand may also include a housing that surrounds the hollow needle dispensing nozzle and which allows an operator to more easily grasp the nozzle when inserting it through the elastomeric bung of the empty wine barrel. In order to avoid unnecessary venting of unused SO2 gas still contained within the bore of the hollow needle dispensing nozzle after it is retracted from the elastomeric bung, the inner diameter of the bore is relatively smaller, for example 3.2 mm.

The batch flow controller serves the function of controlling initiation and stoppage of a flow of $SO_2$ from the hollow needle dispensing nozzle into the interior of the wine barrel. It may be as simple as a toggle valve that includes a lever that may be manipulated by an operator between an on orientation in which a flow of $SO_2$ is allowed therethrough and an off orientation in which a flow of $SO_2$ is prevented therethrough. If the toggle valve is switched on and subsequently off after a suitable period of time, a predetermined dose may be injected into the interior of the wine barrel. Alternatively, the batch flow controller may be a batch mass flow controller. The batch mass flow controller includes a sensor that measures a mass flow rate or volumetric flow rate of gas flowing therethrough, a control valve, and a programmable logic controller or the like that controls operation of the control valve based upon the measured mass flow rate/volumetric flow rate. If the pressure and temperature of the $SO_2$ gas and the desired dose (expressed either in terms of mass or volume) is known, the programmable logic controller is coded with an algorithm that initiates a flow of $SO_2$ gas (upon the command of an operator) by opening up the control valve and closes the control valve when the time-integrated mass flow rate or volumetric flow rate reaches the desired dose.

As mentioned above, while the compressed gas cylinder and the hollow needle dispensing nozzle are disposed at opposite ends of the flow path of the system of the invention, the position of the batch flow controller may vary in different embodiments of the invention. The batch flow controller may be connected in fluid communication between the compressed gas cylinder and the hose. Alternatively, it may be connected in fluid communication between the hose and the dosing wand. The batch flow controller may instead be integrated into the dosing wand.

The empty wine barrel to be dosed with $SO_2$ gas is provided with an opening that is closed with an elastomeric bung. The hollow needle dispensing nozzle has a tapered end that is adapted and configured to pierce through the elastomeric bung and into the interior of the wine barrel. It also includes one or more apertures adjacent the tapered end to allow $SO_2$ gas to flow out of the bore of the needle and into the interior of the wine barrel. The elastomeric material of the bung provides a fluid-tight seal around the periphery of the hollow needle dispensing nozzle. The bung may be made of a composite material in which a centrally-disposed core extending along an axis of the bung is made of a less rigid and more compressible material while an annular portion of the bung surrounding the core is made of a more rigid and less compressible material.

We will now describe particular embodiments of the system of the invention.

As best shown in FIGS. 1A-1C, a compressed gas cylinder 11 (filled with liquefied $SO_2$ under its own vapor) is connected to a toggle valve 13 via flexible hose 12. Hose 12 is connected to dosing wand 15. Toggle valve 13 includes a lever 14 that may be actuated by an operator into an "on" orientation in which a flow of $SO_2$ gas from the cylinder 11 to the dosing wand 15 is allowed an and an "off" orientation in which the flow of $SO_2$ gas is prevented. An operator may press the hollow needle dispensing nozzle portion of dosing wand 15 into elastomeric bung 17 that provides a close to an opening in empty wine barrel 18. Using a twisting motion, the hollow needle dispensing nozzle pierces through bung 17 so that $SO_2$ gas may flow out of one or more apertures in nozzle and into an interior 19 of the wine barrel 18. After insertion, the operator flips lever 14 from the off orientation to the on orientation to initiate flow of $SO_2$ gas in the wine barrel interior 19. After passage of the desired period of time, the operator flips lever 14 back to the off orientation to prevent flow of $SO_2$ into the wine barrel interior 19.

As best illustrated in FIGS. 2A-2B, a compressed gas cylinder 21 (again filled with liquefied $SO_2$ gas under its own vapor) is connected to batch mass flow controller 23 via fitting 24. A first, upstream end of hose 22 is connected to an outlet of batch mass flow controller 23 while a second, downstream end of hose 22 is connected to dosing wand 25. As seen in magnified view of portion A, the dosing wand 25 is connected to hose 22 via fittings 25. A hollow needle dispensing nozzle 29 (including one or more apertures adjacent its terminal end) forming part of dosing wand 25 has been inserted through bung 27 in an opening of empty wine barrel 28 so as to allow $SO_2$ gas to exit nozzle 29 and enter into an interior of barrel 28.

In operation, the operator (typically wearing approved safety gear) places an elastomeric bung in the opening of an empty wine barrel if one is not already provided. The operator then presses the needle into the elastomeric bung with a twisting motion so as to pierce through the elastomeric bung and dispose the one or more apertures of the needle within the interior of the barrel. Depending upon the specific batch flow controller selected for use in the system of the invention, the operator either flips a lever of a toggle valve to its open position or presses a button or touchscreen of a batch mass flow controller to initiate flow of $SO_2$ gas into the wine barrel interior. Again, depending upon the specific batch flow controller employed, either the operator flips the lever of a toggle valve back to its closed position after a suitable period of time (e.g., 3-5 seconds). Or, in the case of a batch mass flow controller, the controller automatically stops the flow of $SO_2$ once the desired dose has been injected into the wine barrel interior. Regardless of the specific type of controller employed, typically the operator will wait a suitable period of time to allow the $SO_2$ within the needle bore to mix with the gas in the interior of the wine barrel (e.g., 2-3 seconds).

The amount of $SO_2$ dispensed can be estimated from published data and equations, using the flow coefficient of the needle valve, the density of $SO_2$ gas, the cylinder pressure, and application time. At an average flow rate of 2.5 standard cubic feet per minute (scfm), the average dose is 4.5 liters of $SO_2$ gas. In a typical wine barrel this will result in a $SO_2$ dosage concentration of 1-2% by volume. The concentration of $SO_2$ in the barrel will decrease over time due to interaction with the barrel and contents.

The invention allows the $SO_2$ to be contained safely inside the barrel by the elastomeric bung. The very small internal volume of the application needle is the only amount of $SO_2$ that is potentially spilled into the environment. When performed in a well ventilated area, this will reduce operator exposure to less than the allowable limits. The amount of the spilled volume will be much less than current allowable environmental limits. The invention also decreases the amount of $SO_2$ gas that is not injected into a wine barrel and therefore wasted.

While the invention has been described in conjunction with specific embodiments thereof, it is evident that many alternatives, modifications, and variations will be apparent to those skilled in the art in light of the foregoing description. Accordingly, it is intended to embrace all such alternatives; modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents; unless the context clearly dictates otherwise.

"Comprising" in a claim is an open transitional term which means the subsequently identified claim elements are a nonexclusive listing i.e. anything else may be additionally included and remain within the scope of "comprising," "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing; supplying, making available; or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties; as well as for the specific information for which each is cited.

What is claimed is:

1. System for dosing $SO_2$ into wine barrels, comprising a compressed gas cylinder containing compressed liquefied $SO_2$ under its own vapor pressure, a dosing wand fluidly connected to said cylinder that comprises a hollow needle dispensing nozzle at a terminal end thereof, a hose in fluid communication between said cylinder and said dosing wand, and a $SO_2$ batch flow controller in fluid communication between said cylinder and said hollow needle dispensing nozzle, said hollow needle dispensing nozzle being adapted and configured to pierce through an elastomeric bung of a wine barrel and having at least one aperture at a terminal end thereof to allow gaseous $SO_2$ to be dispensed into an interior of the wine barrel.

2. The system of claim 1, wherein said batch flow controller is a toggle valve having a lever that is operable by an operator between an on orientation in which a flow of $SO_2$ is allowed therethrough and an off orientation in which a flow of $SO_2$ is prevented therethrough, a desired dose of gaseous $SO_2$ being deliverable to an interior of a wine barrel by dispensing gaseous $SO_2$ into the wine barrel for a predetermined period of time while the toggle valve is in the on orientation.

3. The system of claim 1, wherein said batch flow controller is a batch mass flow controller that is adapted and configured to dispense a predetermined mass of gas from the dispensing wand.

4. The system of claim 1, wherein said batch flow controller is a batch volumetric flow controller that is adapted and configured to dispense a predetermined volume of gas from the dispensing wand.

5. The system of claim 1, wherein said batch flow controller is a batch mass flow controller that is adapted and configured to dispense a predetermined mass of gas from the dispensing wand and said step of using the system of claim 1 comprises pressing a button on said batch flow controller to initiate dispensation of a predetermined mass of $SO_2$ into the interior of the wine barrel.

6. The system of claim 1, wherein said batch flow controller is a batch volumetric flow controller that is adapted and configured to dispense a predetermined volume of gas from the dispensing wand and said step of using the system of claim 1 comprises pressing a button on said batch flow controller to initiate dispensation of a predetermined volume of $SO_2$ into the interior of the wine barrel.

\* \* \* \* \*